(12) United States Patent
Kaap et al.

(10) Patent No.: US 8,965,659 B2
(45) Date of Patent: Feb. 24, 2015

(54) SPEED CONTROL FOR A FIXED PITCH RAM AIR TURBINE

(75) Inventors: Dustin L. Kaap, Rockford, IL (US); Conor Riordan, Grand Rapids, MI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 325 days.

(21) Appl. No.: 13/428,724

(22) Filed: Mar. 23, 2012

(65) Prior Publication Data

US 2013/0253734 A1 Sep. 26, 2013

(51) Int. Cl.
*G06F 19/00* (2011.01)
*G06G 7/70* (2006.01)

(52) U.S. Cl.
USPC .................................. 701/100; 701/3; 244/58

(58) Field of Classification Search
USPC .............. 701/3, 100; 700/295; 244/58, 118.5, 244/135 R, 102 R, 134 D, 134 R, 135 A; 322/34; 307/38, 9.1; 702/144
See application file for complete search history.

(56) References Cited

U.S. PATENT DOCUMENTS

| | | | |
|---|---|---|---|
| 2,777,524 A | 6/1953 | Chapman et al. | |
| 4,770,368 A | 9/1988 | Yates et al. | |
| 5,122,036 A | 6/1992 | Dickes et al. | |
| 5,145,324 A | 9/1992 | Dickes et al. | |
| 5,249,924 A * | 10/1993 | Brum | 416/48 |
| 5,466,974 A * | 11/1995 | Sutrina et al. | 307/38 |
| 5,505,587 A | 4/1996 | Ghetzler | |
| 5,562,417 A | 10/1996 | Grimm et al. | |
| 7,207,521 B2 * | 4/2007 | Atkey et al. | 244/58 |
| 7,210,653 B2 * | 5/2007 | Atkey et al. | 244/58 |
| 7,296,970 B2 | 11/2007 | Bannon et al. | |
| 7,306,430 B2 | 12/2007 | Russ | |
| 7,780,412 B2 | 8/2010 | Zang et al. | |
| 7,950,606 B2 * | 5/2011 | Atkey et al. | 244/135 R |
| 8,575,900 B2 * | 11/2013 | Spierling | 322/34 |
| 2004/0129835 A1 * | 7/2004 | Atkey et al. | 244/118.5 |
| 2006/0102790 A1 * | 5/2006 | Atkey et al. | 244/134 R |
| 2006/0239817 A1 | 10/2006 | Nohr et al. | |
| 2006/0257247 A1 * | 11/2006 | Seidel et al. | 415/123 |
| 2007/0267540 A1 * | 11/2007 | Atkey et al. | 244/58 |
| 2007/0284480 A1 * | 12/2007 | Atkey et al. | 244/135 R |
| 2012/0013177 A1 * | 1/2012 | Krenz et al. | 307/9.1 |
| 2012/0056601 A1 * | 3/2012 | Spierling | 322/34 |
| 2012/0107119 A1 * | 5/2012 | Bannon | 416/44 |
| 2012/0133150 A1 * | 5/2012 | Dooley et al. | 290/1 A |
| 2012/0328436 A1 * | 12/2012 | Soidel et al. | 416/47 |
| 2013/0062943 A1 * | 3/2013 | Bauer et al. | 307/23 |
| 2013/0204544 A1 * | 8/2013 | Thomas | 702/41 |
| 2013/0320136 A1 * | 12/2013 | Zhou et al. | 244/58 |
| 2014/0032002 A1 * | 1/2014 | Iwashima et al. | 700/295 |

* cited by examiner

*Primary Examiner* — Khoi Tran
*Assistant Examiner* — Jaime Figueroa
(74) *Attorney, Agent, or Firm* — Cantor Colburn LLP

(57) ABSTRACT

A system of speed control for a ram air turbine of an aircraft includes a power electronics controller, at least one routing device in communication with the power electronics controller, at least one secondary load in serial communication with the at least one routing device and the power electronics controller, and a ram air turbine (RAT) in communication with the power electronics controller, wherein the power electronics controller is configured to apply the secondary load to the RAT through the at least one routing device in response to a transient speed increase of the RAT.

16 Claims, 3 Drawing Sheets

SPEED CONTROL FOR A FIXED PITCH RAM AIR TURBINE

BACKGROUND OF THE INVENTION

The present invention relates to ram air turbines, and more particularly, exemplary embodiments of the present invention are directed to speed control of fixed pitch ram air turbines.

A Ram Air Turbine (RAT) is commonly an aircraft power system which extracts energy from the air stream of an aircraft in order to provide emergency or auxiliary electrical and/or hydraulic power. A RAT conventionally includes a turbine assembly, strut assembly, generator and/or hydraulic pump, and actuator. During operation, the turbine assembly, which is attached to the strut, is deployed into the air stream by means of the actuator. Once deployed, the turbine is driven by the energy of the air stream surrounding the aircraft. The rotational motion of the turbine is then converted into electrical and/or hydraulic power.

RAT turbine speed is typically controlled by a closed loop mechanical governing mechanism which uses counterweights to adjust the pitch of the turbine blades. Governing (speed control) is needed to control RAT system power quality and limit structural loads in the RAT rotating components. If the RAT turbine is not governed, over-speed conditions can occur which generate large, unwanted forces, and disrupt or damage generators of RATs.

Another form of RAT, dubbed "ducted" or "inboard," includes an enclosed turbine which is integral to a main aircraft fuselage or attached to the exterior of the aircraft via the use of a pod or similar device. Inboard RATs are driven by an axial-style, fixed pitch turbine which utilizes a shroud or ducting for channeling the input high velocity air. Inboard RATs can be used for both supplemental and emergency power generation applications.

Conventional inboard RAT designs use fixed pitched turbines and actuating doors or throttle-like control mechanisms in order to limit an amount of air flow entering or exiting the turbine. However, such designs have an inherent response lag and cannot account for short duration transient load drops that allow the turbine to accelerate and can induce over-speed conditions.

BRIEF DESCRIPTION OF THE INVENTION

According to an exemplary embodiment of the present invention, a system of speed control for a fixed pitch ram air turbine of an aircraft includes a power electronics controller, at least one routing device in communication with the power electronics controller, at least one secondary load in serial communication with the at least one routing device and the power electronics controller, and a ram air turbine (RAT) in communication with the power electronics controller. The power electronics controller is configured to apply the secondary load to the RAT through the at least one routing device in response to a transient speed increase of the RAT.

According to another exemplary embodiment of the present invention, a method of speed control of a fixed pitch ram air turbine of an aircraft includes monitoring speed of the ram air turbine (RAT), determining if the monitored speed meets or exceeds a speed threshold, and applying a braking load or a braking torque to the ram air turbine responsive to determining the monitored speed meets or exceeds the speed threshold.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Exemplary embodiments of the present invention provide systems and methods which may improve speed control of fixed pitch ram air turbines (RAT). The technical effects and benefits of embodiments of the invention include improved power quality (higher speed band) and the decreased risk of RAT over-speed which decreases the risk of associated over-speed damage.

Figure 1:
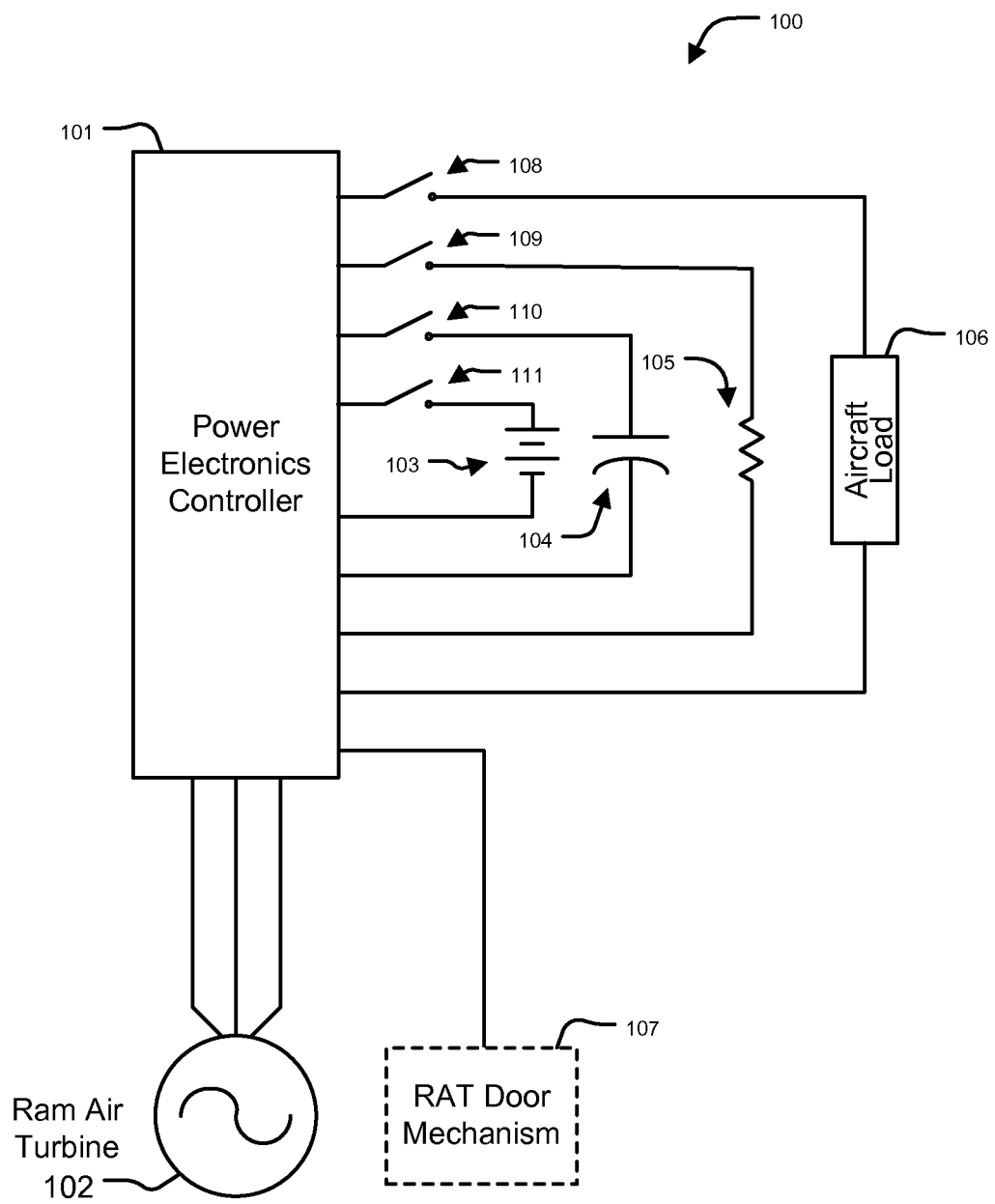
FIG. 1 is a system of speed control for a fixed pitch ram air turbine, according to an exemplary embodiment of the present invention.

Turning to FIG. 1, a system 100 of speed control for a fixed pitch RAT 102 is illustrated. The system 100 includes power electronics controller 101. The power electronics controller 101 may be a controller configured to deploy, monitor, and control one or more RATs of an aircraft as well as monitor, control, and route power to essential aircraft power systems (e.g., flight controls, communications, instrumentation, etc). The controller 101 may be any suitable controller, including conventional aircraft power electronics controllers. In the event of load demand, the controller 101 is configured to deploy or initialize fixed pitch RAT 102. Deployment may include opening the (optional) RAT door mechanism 107. The fixed pitch RAT 102 is in electrical communication with controller 101 such that power generated by the fixed pitch RAT 102 may be provided thereto.

The system 100 further includes a plurality of electrical routing devices 108, 109, 110, and 111 in serial electrical communication with a plurality of power sources and loads 103, 104, 105, and 106. The plurality of electrical routing devices may be switches, relays, or any similar routing devices configured to open/close according to signals applied from the controller 101. Power source 103 may be a battery or battery-like storage device in serial communication with routing device 111 and controller 101. Power source 104 may be a capacitor or super-capacitor in serial communication with routing device 110 and controller 101. Load 105 may be a secondary load (e.g., radar electronics for jamming pod RATs) or a non-essential aircraft load (e.g., de-icers) in serial communication with routing device 109 and controller 101. The term "secondary load" as used herein includes non-essential aircraft loads. Finally, load 106 may be an essential aircraft load, such as instrumentation or emergency lighting, in serial communication with routing device 108 and controller 101. It should be understood that load 106 may be a dynamic load, changing according to circumstance which may both increase or decrease its effective magnitude.

The controller 101 may open or close routing devices 108-111 to establish a conduction path between the fixed pitch RAT and any particular power source or load 103-106.

For example, if a power failure occurs or is eminent, the controller 101 may direct a RAT door mechanism 107 to open or increase aperture size to allow an air stream to engage the RAT 102. The air stream powers and turns the RAT 102, which in turn generates electricity and provides the same to the controller 101. Thereafter, and/or during RAT deployment, the controller 101 may close routing device 108 to allow power to flow to essential aircraft load 106. As the load 106 may be dynamic, a sudden change in its magnitude may cause a short duration transient load drop which causes an increase in speed of the RAT 102. The controller 101 may monitor this speed, and if a threshold is met or exceeded, the controller may close any of routing devices 109, 110, and 111 to either increase the load seen by the RAT 102 (e.g., apply a braking load), or introduce a braking torque to slow the RAT 102 (e.g., from power flowing from capacitor 104 or battery 103 back to RAT 102).

Thus, if a short duration transient load drop occurs in an aircraft employing system 100, an associated RAT speed may be controlled and reduced, thereby improving power quality and reducing occurrences of over-speed conditions.

Figure 2:
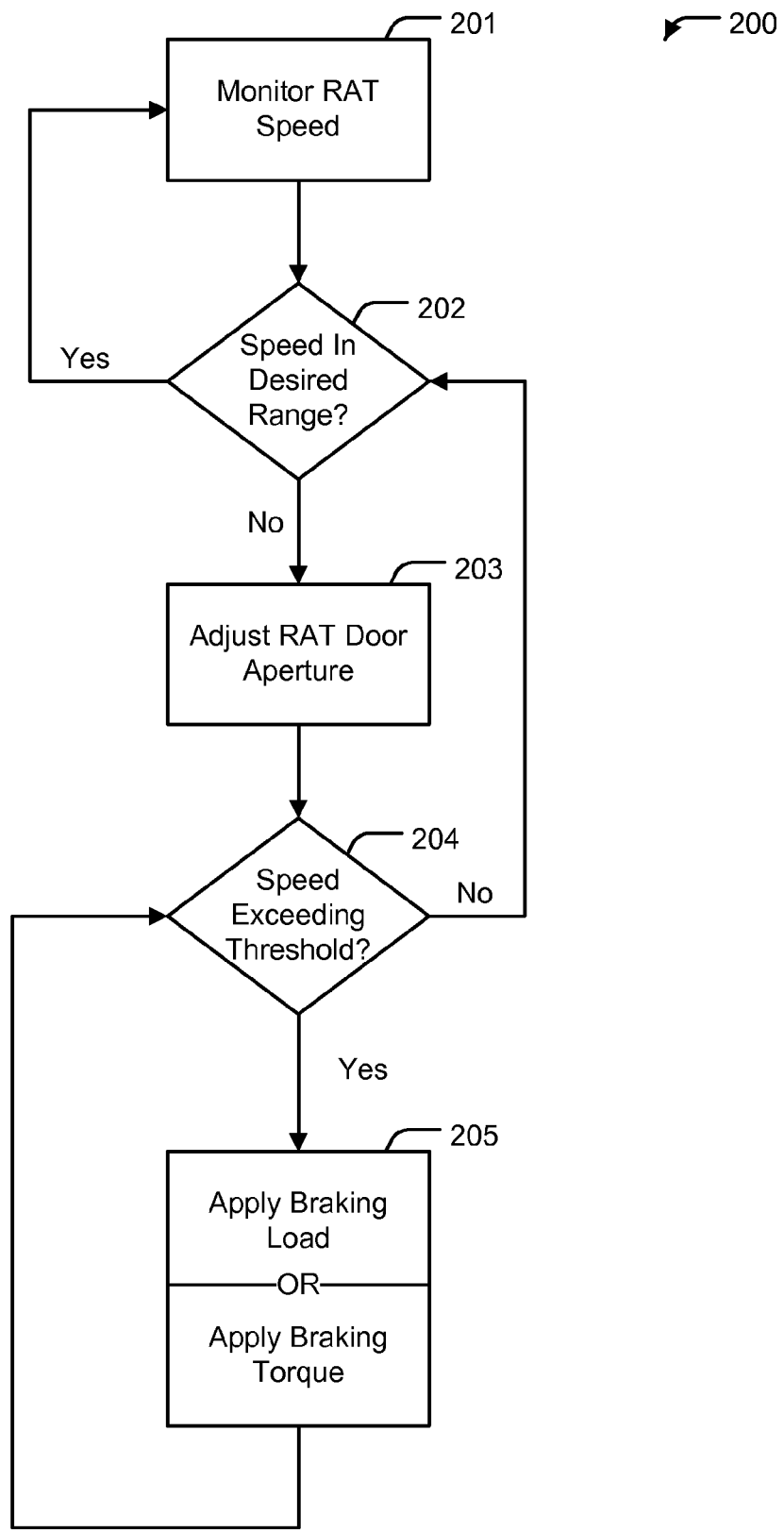
FIG. 2 is a flowchart of a method of speed control for a inboard or ducted fixed pitch ram air turbine, according to an exemplary embodiment of the present invention.

Turning now to FIG. 2, a flowchart of a method of speed control of a RAT is illustrated. As shown, the method 200 includes monitoring ram air turbine (RAT) speed at block 201. Monitoring RAT speed may include monitoring a frequency of a generator of the RAT. The frequency may be used to calculate a rotational speed of the turbine itself. Thereafter, a determination is made at block 202 if the RAT speed is within a predetermined or desired range.

Upon determination the RAT speed is within the predetermined or desired range, the method 200 continually monitors the RAT speed (e.g., loop through blocks 201-202).

Upon determination the RAT speed is not within the predetermined or desired range, the method 200 includes adjusting a RAT door aperture at block 203. For example, adjusting the RAT entrance door aperture includes adjusting a mechanical position of RAT door mechanism 107 such that the associated aperture is increased (e.g., if RAT speed is lower than desired range) or such that the associated aperture is decreased (e.g., if RAT speed is higher than desired range).

Subsequently, or at substantially the same time as the adjusting, the method 200 includes determining if a current speed of the RAT meets or exceeds a predetermined or desired threshold at block 204.

Upon determining the speed of the RAT does not meet or exceed the predetermined or desired threshold, the method 200 includes monitoring RAT speed and adjusting the RAT door aperture continually (e.g., loop through blocks 202-204) until the RAT speed is within the predetermined or desired range.

Upon determining the speed of the RAT does meet or exceed the predetermined or desired threshold, the method 200 includes applying a braking load or applying a braking torque at block 205, and subsequently determining if the threshold is still met or exceeded (e.g., loop through blocks 204-205). The applying the braking load may include closing a routing device such as routing device 109 to increase an effective load seen at the RAT 102, thereby slowing a speed of the turbine during a transient load drop. The applying the braking torque includes closing routing devices 110 and/or 111 to introduce a counter-flow of electrons through an associated generator of the RAT 102. It is noted that depending upon a relative charge state of the battery 103 and super-capacitor 104, a braking load may also be generated if a voltage provided by RAT 102 exceeds that of either the battery 103 or super-capacitor 104.

Upon reduction in RAT speed to below the predetermined or desired threshold, the method 200 continues monitoring (block) 202 and adjusting (block 203) as described above.

Figure 3:
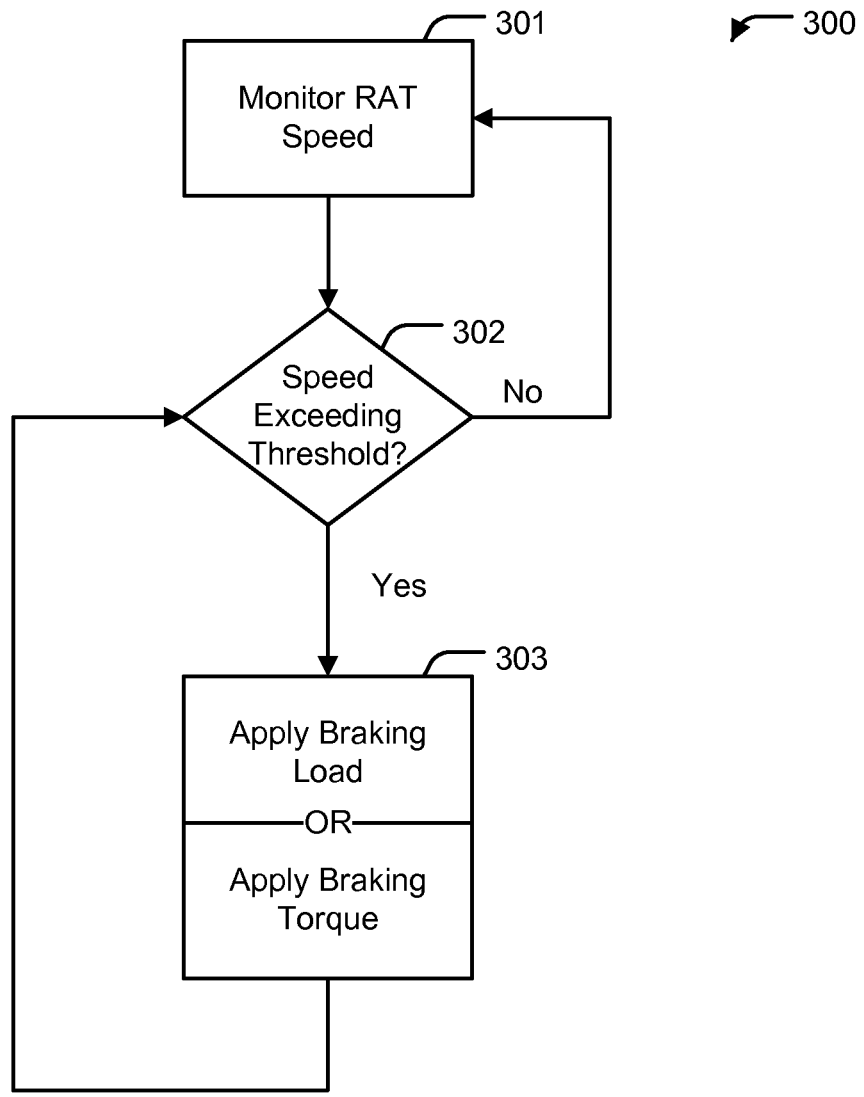
FIG. 3 is a flowchart of a method of speed control for a fixed pitch ram air turbine absent a door mechanism (e.g., a deployable, fixed pitch RAT), according to an exemplary embodiment of the present invention.

Although particularly described and illustrated as relating to inboard RAT with available door mechanisms, the methodologies described herein may be varied in many ways. For example, FIG. 3 depicts a flowchart of a method of speed control of a RAT absent a door mechanism.

As illustrated, the method 300 includes monitoring RAT speed at block 301. The monitoring may be similar to the monitoring described above with reference to FIG. 2. Thereafter, the method 300 includes determining if the monitored speed meets or exceeds a predetermined or desired threshold at block 302.

Upon determining the speed of the RAT does not meet or exceed the predetermined or desired threshold, the method 300 includes monitoring RAT speed continually (e.g., loop through blocks 301-302) until the RAT speed meets or exceeds the predetermined or desired threshold.

Upon determining the speed of the RAT does meet or exceed the predetermined or desired threshold, the method 300 includes applying a braking load or applying a braking torque at block 303, and subsequently determining if the threshold is still met or exceeded (e.g., loop through blocks 302-303). The applying the braking load may include closing a routing device such as routing device 109 to increase an effective load seen at the RAT 102, thereby slowing a speed of the turbine during a transient load drop. The applying the braking torque includes closing routing devices 110 and/or 111 to introduce a counter-flow of electrons through an associated generator of the RAT 102. It is noted that depending upon a relative charge state of the battery 103 and super-capacitor 104, a braking load may also be generated if a voltage provided by RAT 102 exceeds that of either the battery 103 or super-capacitor 104.

Upon reduction in RAT speed to below the predetermined or desired threshold, the method 300 continues monitoring (blocks 301-302) as described above.

Therefore, as presented herein, methods of speed control of inboard RAT provide for avoidance of over-speed conditions through the application of braking loads or braking torques responsive to measured RAT speed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system of speed control for a ram air turbine of an aircraft, comprising:
   a power electronics controller;
   at least one routing device in communication with the power electronics controller;
   at least one secondary load in serial communication with the at least one routing device and the power electronics controller; and
   a ram air turbine (RAT) in communication with the power electronics controller;
   wherein the power electronics controller is configured to apply the secondary load to the RAT through the at least one routing device in response to a transient speed increase of the RAT;
   wherein the power electronics controller determines if a monitored speed of the RAT is within a desired speed range and adjusts a RAT door aperture responsive to determining the monitored speed is not within the desired speed range.

2. The system of claim 1, further comprising:
a second routing device in communication with the power electronics controller; and
an essential aircraft load in serial communication with the second routing device and the power electronics controller;
wherein the power electronics controller is further configured to route power to the essential aircraft load through the second routing device in response to aircraft power failure.

3. The system of claim 2, wherein the power electronics controller is further configured to apply the secondary load to the RAT through the at least one routing device in response to a short duration transient load drop of the essential aircraft load.

4. The system of claim 1, wherein the secondary load is an aircraft wing de-icing load.

5. The system of claim 1, further comprising:
a plurality of additional routing devices in communication with the power electronics controller; and
a plurality of additional loads in serial communication with individual routing devices of the plurality of additional routing devices and the power electronics controller;
wherein the power electronics controller is further configured to apply one or more of the plurality of additional loads to the RAT through one or more of the plurality of additional routing devices in response to a transient speed increase of the RAT.

6. The system of claim 1, further comprising:
a plurality of additional routing devices in communication with the power electronics controller; and
a plurality of power sources in serial communication with individual routing devices of the plurality of additional routing devices and the power electronics controller;
wherein the power electronics controller is further configured to apply one or more of the plurality of power sources to the RAT through one or more of the plurality of additional routing devices in response to a transient speed increase of the RAT.

7. The system of claim 6, wherein the plurality of power sources includes at least one battery or super-capacitor.

8. The system of claim 1, wherein the RAT is an inboard RAT.

9. The system of claim 8, further comprising the RAT door aperture mechanism in communication with the power electronics controller and configured to control an amount of air flow to the inboard RAT.

10. The system of claim 9, wherein the power electronics controller is further configured to adjust the RAT door aperture responsive to changes in speed of the inboard RAT.

11. A method of speed control of a ram air turbine of an aircraft, comprising:
monitoring speed of the ram air turbine (RAT) with a computing device;
determining if the monitored speed meets or exceeds a speed threshold;
applying a braking load or a braking torque to the ram air turbine responsive to determining the monitored speed meets or exceeds the speed threshold;
determining if the monitored speed is within a desired speed range; and
adjusting a RAT door aperture responsive to determining the monitored speed is not within the desired speed range.

12. The method of claim 11, wherein adjusting the RAT door aperture comprises:
directing a RAT door mechanism to vary the RAT door aperture responsive to the monitored speed.

13. The method of claim 12, wherein adjusting the RAT door aperture further comprises:
directing the RAT door mechanism to increase the RAT door aperture responsive to determining the monitored speed is below the desired speed range; and
directing the RAT door mechanism to decrease the RAT door aperture responsive to determining the monitored speed is above the desired speed range.

14. The method of claim 11, wherein monitoring the speed of the RAT comprises:
measuring a frequency of power generated at a generator of the RAT; and
calculating a current speed of the RAT based on the measured frequency.

15. The method of claim 11, wherein applying the braking load comprises:
closing a routing device in serial communication with a load and the RAT.

16. The method of claim 11, wherein applying the braking torque comprises:
closing a routing device in serial communication with a power source and the RAT.

* * * * *